(12) United States Patent
Jimenez et al.

(10) Patent No.: US 9,523,419 B2
(45) Date of Patent: Dec. 20, 2016

(54) PRE-STRESSED TORQUE CONVERTER SHELL

(71) Applicant: Schaeffler Technologies GmbH & Co. KG, Herzogenaurach (DE)

(72) Inventors: Alfredo Jimenez, Wooster, OH (US); James Copeland, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 84 days.

(21) Appl. No.: 14/457,527

(22) Filed: Aug. 12, 2014

(65) Prior Publication Data
US 2015/0047193 A1   Feb. 19, 2015

Related U.S. Application Data

(60) Provisional application No. 61/865,242, filed on Aug. 13, 2013.

(51) Int. Cl.
| | |
|---|---|
| F16H 41/24 | (2006.01) |
| F16H 41/26 | (2006.01) |
| F16H 41/28 | (2006.01) |
| F16H 41/00 | (2006.01) |
| F16D 13/18 | (2006.01) |

(52) U.S. Cl.
CPC ............... *F16H 41/28* (2013.01); *F16H 41/00* (2013.01); *F16H 41/24* (2013.01); *F16H 41/26* (2013.01); *F16H 2041/243* (2013.01); *F16H 2041/246* (2013.01); *Y10T 29/4933* (2015.01); *Y10T 29/49332* (2015.01)

(58) Field of Classification Search
CPC ........... Y10T 29/4933; Y10T 29/49332; F16H 41/24;F16H 41/28; F16H 2041/243; F16H 41/00; F16H 2041/246; F16H 41/26; F16D 33/18; B21D 22/02–22/08; B21D 22/20–22/30
USPC ................ 29/889.4, 889.5, 888.46; 192/112, 192/3.21–3.33; 474/144
See application file for complete search history.

(56) References Cited

U.S. PATENT DOCUMENTS

| | | | | |
|---|---|---|---|---|
| 3,576,070 | A * | 4/1971 | Parsons | B23Q 3/062 29/527.6 |
| 4,462,269 | A * | 7/1984 | Inglis | F16F 15/1315 123/185.1 |
| 4,608,883 | A * | 9/1986 | Bopp | F16D 3/52 464/24 |
| 5,384,958 | A * | 1/1995 | O'Daniel | B21D 53/80 29/557 |
| 5,718,311 | A * | 2/1998 | Victoria | F16H 45/02 192/3.28 |
| 5,799,763 | A * | 9/1998 | Dehrmann | F16D 13/64 192/107 C |

(Continued)

*Primary Examiner* — Christopher Besler
*Assistant Examiner* — Bayan Salone
(74) *Attorney, Agent, or Firm* — Volpe and Koenig, P.C.

(57) ABSTRACT

A method for manufacturing a torque converter shell is provided to induce favorable residual stress in a direction of a loading condition to improve durability during cycle pressurization. The method includes inducing favorable residual stress on a front cover, an impeller shell, or both the front cover and the impeller shell to improve the durability of these components. The induced residual stresses reduce the stress experienced by these components during operation. The front cover and impeller shell are welded together to form the torque converter shell.

9 Claims, 1 Drawing Sheet

(56) References Cited

U.S. PATENT DOCUMENTS

| | | | | |
|---|---|---|---|---|
| 6,053,024 A * | 4/2000 | Yoshida | F16H 41/28 | 72/379.2 |
| 6,530,253 B1 * | 3/2003 | Gotou | B21D 53/28 | 192/70.2 |
| 6,691,542 B2 * | 2/2004 | Fukukawa | B21D 53/28 | 72/84 |
| 6,725,988 B2 * | 4/2004 | Bauer | F16H 45/02 | 192/200 |
| 6,886,330 B1 * | 5/2005 | Turner | F16D 33/18 | 416/197 C |
| 7,401,490 B2 * | 7/2008 | Copeland | B21D 7/06 | 72/369 |
| 7,594,762 B2 * | 9/2009 | Watanabe | F04B 27/1063 | 384/618 |
| 8,024,846 B2 * | 9/2011 | Luna | B23P 9/00 | 29/90.5 |
| 8,225,917 B2 * | 7/2012 | Yamashita | F16H 41/28 | 192/3.29 |
| 8,677,598 B2 * | 3/2014 | Lindemann | F16H 45/02 | 192/200 |
| 8,776,972 B2 * | 7/2014 | Vanni | F16D 3/06 | 192/109 R |
| 8,819,915 B2 * | 9/2014 | Jimenez | F16H 45/02 | 192/200 |
| 2002/0005324 A1 * | 1/2002 | Sasse | F16H 45/02 | 192/3.29 |
| 2002/0040835 A1 * | 4/2002 | Fukukawa | B21D 53/28 | 192/3.28 |
| 2002/0153222 A1 * | 10/2002 | Takabayashi | F16H 41/24 | 192/218 |
| 2004/0172936 A1 * | 9/2004 | Mueller | F16D 33/18 | 60/330 |
| 2005/0103005 A1 * | 5/2005 | Turner | F16D 33/18 | 60/330 |
| 2006/0147311 A1 * | 7/2006 | Broderick | B23P 6/002 | 416/223 A |
| 2008/0149448 A1 * | 6/2008 | Hemphill | F16D 41/063 | 192/45.1 |
| 2009/0084649 A1 * | 4/2009 | Kombowski | F16H 45/02 | 192/3.29 |
| 2010/0230225 A1 * | 9/2010 | Yamashita | F16H 41/28 | 192/3.29 |
| 2011/0088992 A1 * | 4/2011 | Lindemann | F16H 45/02 | 192/30 R |
| 2012/0152679 A1 * | 6/2012 | Vanni | F16D 3/06 | 192/3.29 |
| 2012/0291280 A1 * | 11/2012 | Nanbara | F16H 41/28 | 29/889 |
| 2013/0125852 A1 * | 5/2013 | Frey | B21D 22/20 | 123/185.1 |

* cited by examiner

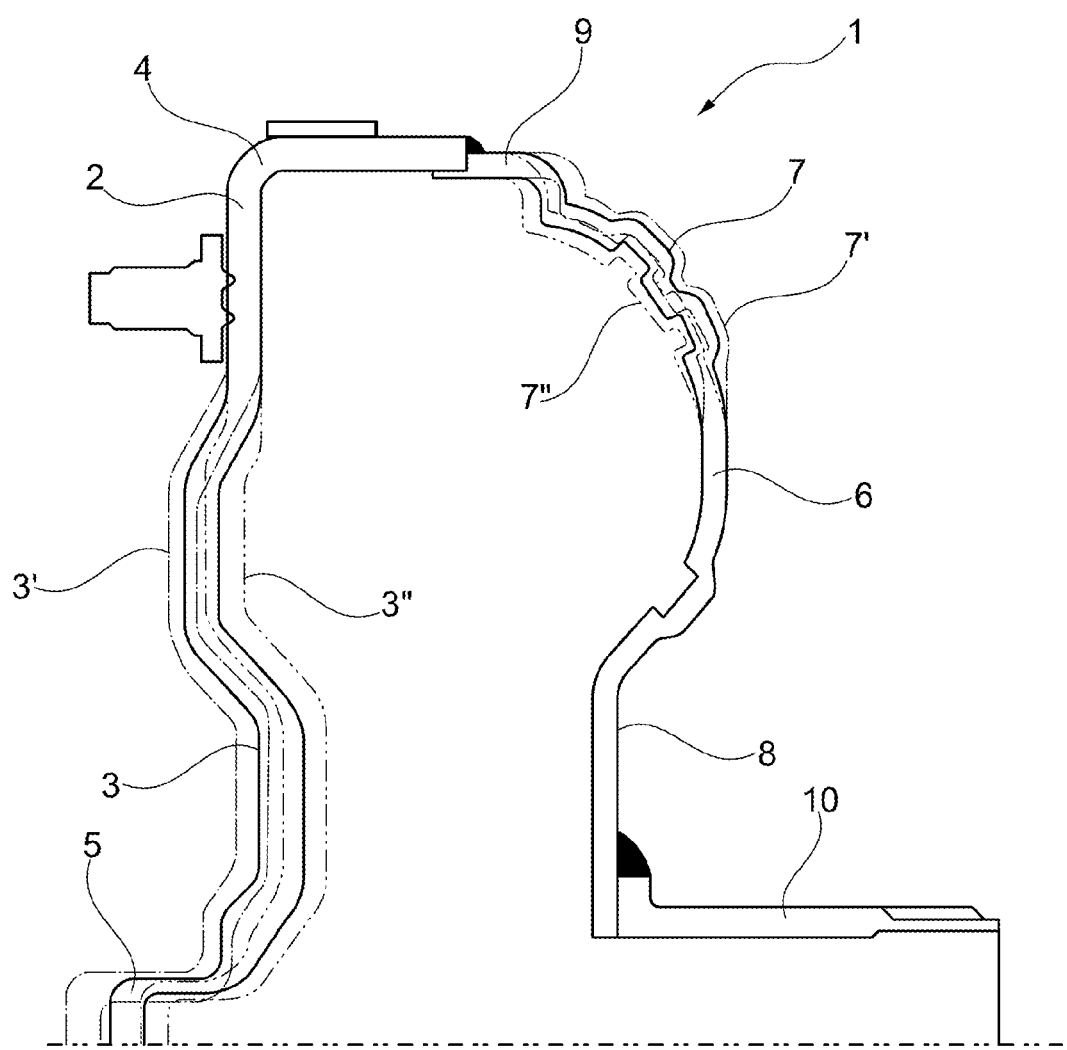

PRE-STRESSED TORQUE CONVERTER SHELL

INCORPORATION BY REFERENCE

The following documents are incorporated herein by reference as if fully set forth: U.S. Provisional Application No. 61/865,242, filed Aug. 13, 2013.

FIELD OF INVENTION

This application is generally related to a torque converter and more particularly to a torque converter shell assembled from a front cover and an impeller shell.

BACKGROUND

Torque converters include a shell that typically are formed as a brazed or welded assembly of a front cover and an impeller shell. The torque converter shell experiences significant cyclic operating stress from centrifugal forces of the hydraulic fluid located therein and from operating automatic transmission fluid pressure to apply or release the torque converter clutch. The operating stress can cause the front cover or impeller shell to crack or fracture, which results in the hydraulic fluid leaking and failure of the torque converter. The thickness and geometry of the torque converter shell are designed to minimize operating stresses. The impeller shell includes vanes on an inner surface which in addition to their torque transfer function, also provide increased stiffness, improving deflection and durability against the operating stress. In contrast, the front cover typically lacks additional features that would provide durability against the operating stress other than formed steps. Accordingly, the front cover is the component of the torque converter shell that typically fails during operation. However, depending on the particular application, either part of the torque converter shell may fail.

Known solutions for increasing the durability of torque converter shells include increasing the thickness of the front cover and/or the impeller shell. However, increasing the thickness of these parts also increases the mass of the torque converter shell, which increases manufacturing costs as well as operating costs due to the increased weight and mass moment of inertia of the torque converter. Accordingly, it would be desirable to increase the durability of a torque converter shell without increasing the mass of the front cover or impeller shell.

SUMMARY

It would be desirable to provide a torque converter shell that includes residual compressive stresses located on the high stressed regions to provide favorable loading in a same direction as the operating stresses in order to provide increased durability.

In order to impart the desired residual compressive stresses in the torque converter shell, a method for manufacturing a torque converter shell is provided. The method includes forming a front cover of the torque converter shell from sheet metal to a first near net shape. The front cover is plastically deformed past the first near net shape in a direction of an operating stress and creates a first residual compressive stress in the torque converter shell after formation of the front cover. An impeller shell of the torque converter shell is formed from sheet metal to a second near net shape. The impeller shell is plastically deformed past the second near net shape in the direction of the operating stress and creates a second residual compressive stress in the torque converter shell after formation of the impeller shell. The front cover and impeller shell are then welded together. The forming sequence of the torque converter shell forms the torque converter shell in the direction of the loading condition in the last forming step to induce favorable residual stress in the direction of the loading condition.

Another method for manufacturing a torque converter shell is provided. The method includes forming a front cover of the torque converter shell from sheet metal to a first near net shape. An impeller shell of the torque converter shell is formed from sheet metal to a second near net shape. The front cover is welded to the impeller shell. A hydraulic pressure that is greater than an operating pressure is supplied to a cavity defined by the front cover and the impeller shell to over-stress the torque converter shell. The front cover and the impeller shell are supported such that the torque converter shell plastically deforms past the first and second near net shapes in the direction of the operating stresses. The plastic deformation of the front cover and the impeller shell causes a first residual compressive stress to remain in the front cover, and a second residual compressive stress to remain in the impeller shell.

Another method for manufacturing a torque converter shell is provided. The method includes forming a front cover of the torque converter shell from sheet metal. The front cover is shot peened, at least in a radially outer region, to create a first residual compressive stress in the torque converter shell after formation of the front cover. An impeller shell of the torque converter shell is formed from sheet metal. The impeller shell is shot peened, at least in a hub region, to create a second residual compressive stress in the torque converter shell after formation of the impeller shell. The front cover is welded to the impeller shell.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings:

FIG. 1 is a cross section view of a torque converter shell being formed according to one embodiment of the invention.

DETAILED DESCRIPTION OF THE PREFERRED EMBODIMENTS

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

A first method for manufacturing a torque converter shell 1 is provided. This first method includes mechanically stamping a front cover 2 and an impeller shell 6 such that the front cover 2 and the impeller shell 6 include residual compressive stresses after formation of the torque converter shell 1. The method includes forming a front cover 2 from sheet metal to a first near net shape 3" as shown in FIG. 1. At least a radially outer region 4 of the front cover 2 is plastically deformed past the first near net shape 3", as marked, in a direction of an operating stress and creates a first residual compressive stress in the torque converter shell 1 after formation of the front cover 2. During operation, hydraulic fluid is forced outward due to rotation of the torque converter shell 1. Centrifugal force of the hydraulic fluid causes operating stresses in the components of the torque converter. In this first preferred embodiment, the front cover 2 is formed via stamping using a number of different shaping dies. As shown in FIG. 1, the front cover 2 is stamped into a first near net shape 3" immediately prior to a final stamping step. The final stamping step deforms the front cover 2 past the first near net shape 3" to the over-stressed position indicated at 3'. After the final stamping step, the front cover 2 springs back to the net shape 3. In the net shape 3, the front cover 2 includes compressive stresses in the radially outer region 4 after formation of the torque converter shell 1. The radially outer region 4 of the front cover 2 is the typical failure region due to operating stresses. One of ordinary skill in the art recognizes other stamping processes can be used to introduce compressive residual stresses in other regions of the front cover 2.

An impeller shell 6 of the torque converter shell 1 is similarly formed from sheet metal to a second near net shape 7" as shown in FIG. 1. At least a hub region 8 of the impeller shell 6 is plastically deformed past the second near net shape 7" in the direction of the operating stress and creates a second residual compressive stress in the torque converter shell 1 after formation of the impeller shell 6. In a preferred embodiment, the impeller shell 6 is also formed via stamping using a number of different shaping dies. As shown in FIG. 1, the impeller shell 6 is stamped into a second near net shape 7" immediately prior to a final stamping step. The final stamping step deforms the impeller shell 6 past the second near net shape 7" to the over-stressed position indicated at 7'. After the final stamping step, the impeller shell 6 springs back to the net shape 7. In the net shape 7, the impeller shell 6 includes compressive stresses in a critical loading zone at least at the hub region 8 after formation of the torque converter shell 1. The hub region 8 of the impeller shell 6 is the typical failure region due to operating stresses. However, one of ordinary skill in the art recognizes other stamping processes can be used to introduce compressive residual stresses in other regions of the impeller shell 6. One of ordinary skill in the art also recognizes that one of the components can be formed to introduce residual compressive stresses, and the other component can be formed by a normal forming operation.

After separately forming each part, the front cover 2 and the impeller shell 6 are welded together, and the hub region 8 of the impeller shell 6 is welded to a hub 10. The first and second residual compressive stresses improve the durability of the torque converter shell 1 by improving the durability of the front cover 2 and impeller shell 6 against damage caused by the operating stress without increasing a thickness of the sheet metal used in forming the torque converter shell 1. Pre-stressing the torque converter shell 1 improves durability and allows the torque converter shell 1 to last for more cycles than existing torque converter shells that are not pre-stressed. The front cover 2 and impeller shell 6 can also be made thinner than typically required due to this increased durability.

Another method for manufacturing a torque converter shell 1 is provided. This method includes forming a front cover 2 of the torque converter shell 1 from sheet metal to a first near net shape 2. An impeller shell 6 of the torque converter shell 1 is also formed from sheet metal to a second near net shape 7. The front cover 2 is welded to the impeller shell 6. A hydraulic pressure that is greater than an operating pressure typically experienced by the torque converter shell 1 is supplied to a cavity defined by the front cover 2 and the impeller shell 6 in order to pre-stress the front cover 2 and the impeller shell 6. Preferably, the hydraulic pressure applied to the cavity is between 30-45 bar, and the hydraulic pressure is applied for ten seconds. One of ordinary skill in the art recognizes a different pre-set hydraulic pressure can be applied to the cavity such that the front cover 2 and impeller shell 6 plastically deform but do not fail. A hub region 5 of the front cover 2 is supported such that at least a radially outer region 4 of the front cover 2 plastically deforms past the first near net shape 3" in a direction of the operating stress due to the hydraulic pressure to the position indicated at 3'. A radially outer region 9 of the impeller shell 6 is supported such that at least a hub region 8 of the impeller shell 6 plastically deforms past the second near net shape 7" in the direction of the operating stress to the position indicated at 7'. After the hydraulic pressure is removed, the front cover 2 springs back to the net shape 3, and the impeller shell 6 springs back to the net shape 7. Preferably, the front cover 2 and the impeller shell 6 are supported on a stand or mounting bracket, with a support for engaging a region of the front cover 2 away from the radially outer region 4, and a support for engaging a region of the impeller shell 6 away from the hub region 8. Supporting these regions minimizes plastic deformation in the regions away from the critical loading areas on both parts. These supports help minimize distortion in portions of the torque converter shell that are less fatigue-prone, and prevent, or at least minimize, undesirable side effects from initial overpressurization, i.e. a dramatic increase in axial end play of the torque converter shell.

The plastic deformation of the radially outer region 4 of the front cover 2 and of the hub region 8 of the impeller shell 6 creates a first residual compressive stress that remains in the front cover 2, and a second residual compressive stress that remains in the impeller shell 6, respectively. An axial height of the torque converter shell 1 measured from a hub region 5 of the front cover 2 to a hub region 8 of the impeller shell 6 can increase by approximately 2-3 mm after pre-stressing by supplying the hydraulic pressure to the cavity. One of ordinary skill in the art will recognize that the axial height can increase by smaller or larger values depending on the particular application. The increased axial end play caused by pre-stressing can be compensated via thrust bearings. The thrust bearings can include snap thrust bearings that include axial retention elements for axially retaining the bearing with a stator. The bearings can be positioned between the stator and a turbine and/or a pump of the impeller shell. The axial height can also be compensated via calibration after pre-stressing the components. One of ordinary skill in the art will recognize that the axial height can be compensated by a variety of techniques, including a variety of bearing configurations.

Another method for manufacturing a torque converter shell 1 is provided. The method includes forming a front cover 2 of the torque converter shell 1 from sheet metal, and forming an impeller shell 6 of the torque converter shell 1 from sheet metal. At least a radially outer region 4 of the front cover 2 is shot peened to create a first residual compressive stress in the torque converter shell 1 after formation of the front cover 2. At least a hub region 8 of the impeller shell 6 is shot peened to create a second residual compressive stress in the torque converter shell 1 after formation of the impeller shell 6. Here, both the front cover 2 and the impeller shell 6 are stamped to the respective net shapes indicated at 3 and 7, respectively. The front cover 2 is welded to the impeller shell 6. Preferably, outer surfaces of both the front cover 2 and the impeller shell 6 are shot peened. Alternatively, just one outer surface of either the front cover 2 or the impeller shell 6 can be shot peened. Additionally, inner surfaces of the front cover 2 or the impeller shell 6 can be shot peened. One of ordinary skill in the art will recognize based on the present disclosure that any critical loading region can be shot peened in order to introduce residual compressive stresses.

Having thus described various embodiments of the present methods of manufacturing a torque converter shell in detail, it is to be appreciated and will be apparent to those skilled in the art that many changes, only a few of which are exemplified in the detailed description above, could be made in the methods without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG TO REFERENCE NUMBERS

1 Torque Converter Shell
2 Front Cover
3 First Net Shape of Front Cover
3' First Near Net Shape of Front Cover
3" First Near Net Shape of Front Cover
4 Radially Outer Region of Front Cover
5 Hub Region of Front Cover
6 Impeller Shell
7 Second Net Shape of Impeller Shell
7' Second Near Net Shape of Impeller Shell
7" Second Near Net Shape of Impeller Shell
8 Hub Region of Impeller Shell
9 Radially Outer Region of Impeller Shell
10 Hub

What is claimed is:

1. A method for manufacturing a torque converter shell, comprising:
   forming a front cover of the torque converter shell from sheet metal to a first near net shape by plastic deformation in a first direction of the front cover;
   forming an impeller shell of the torque converter shell from sheet metal to a second near net shape by plastic deformation in a first direction of the impeller shell;
   at least one of (a) plastically deforming the front cover past the first near net shape in a direction of an operating stress that is opposite from the first direction of the front cover and creating a first residual compressive stress in the torque converter shell after formation of the front cover, or (b) plastically deforming the impeller shell past the second near net shape in a direction of an operating stress that is opposite from the first direction of the impeller shell and creating a second residual compressive stress in the torque converter shell after formation of the impeller shell; and
   welding the front cover to the impeller shell.

2. The method for manufacturing a torque converter shell according to claim 1, wherein at least a radially outer region of the front cover is plastically deformed.

3. The method for manufacturing a torque converter shell according to claim 1, wherein the front cover and the impeller shell are formed by stamping.

4. The method for manufacturing a torque converter shell according to claim 1, wherein at least a hub region of the impeller shell is plastically deformed.

5. A method for manufacturing a torque converter shell, comprising:
   forming a front cover of the torque converter shell from sheet metal to a first near net shape;
   forming an impeller shell of the torque converter shell from sheet metal to a second near net shape;
   welding the front cover to the impeller shell; and
   supplying a hydraulic pressure that is greater than an operating pressure to a cavity defined by the front cover and the impeller shell and over-stressing the torque converter shell, supporting the front cover such that the front cover plastically deforms past the first near net shape in a direction of the operating pressure, and supporting the impeller shell such that the impeller shell plastically deforms past the second near net shape in the direction of the operating pressure, such that a first residual compressive stress remains in the front cover and a second residual compressive stress remains in the impeller shell.

6. The method for manufacturing a torque converter shell according to claim 5, wherein a hub region of the front cover is supported such that at least a radially outer region of the front cover plastically deforms.

7. The method for manufacturing a torque converter shell according to claim 5, wherein a radially outer region of the impeller shell is supported such that at least a hub region of the impeller shell plastically deforms.

8. The method for manufacturing a torque converter shell according to claim 5, wherein the hydraulic pressure applied to the cavity is approximately 30-45 bar.

9. The method for manufacturing a torque converter shell according to claim 5, wherein the hydraulic pressure is applied for approximately 10 seconds.

* * * * *